Dec. 6, 1966 N. K. OLSON 3,290,452
METHODS AND APPARATUS FOR AUTOMATIC SINGING POINT TESTING
Filed Oct. 24, 1963
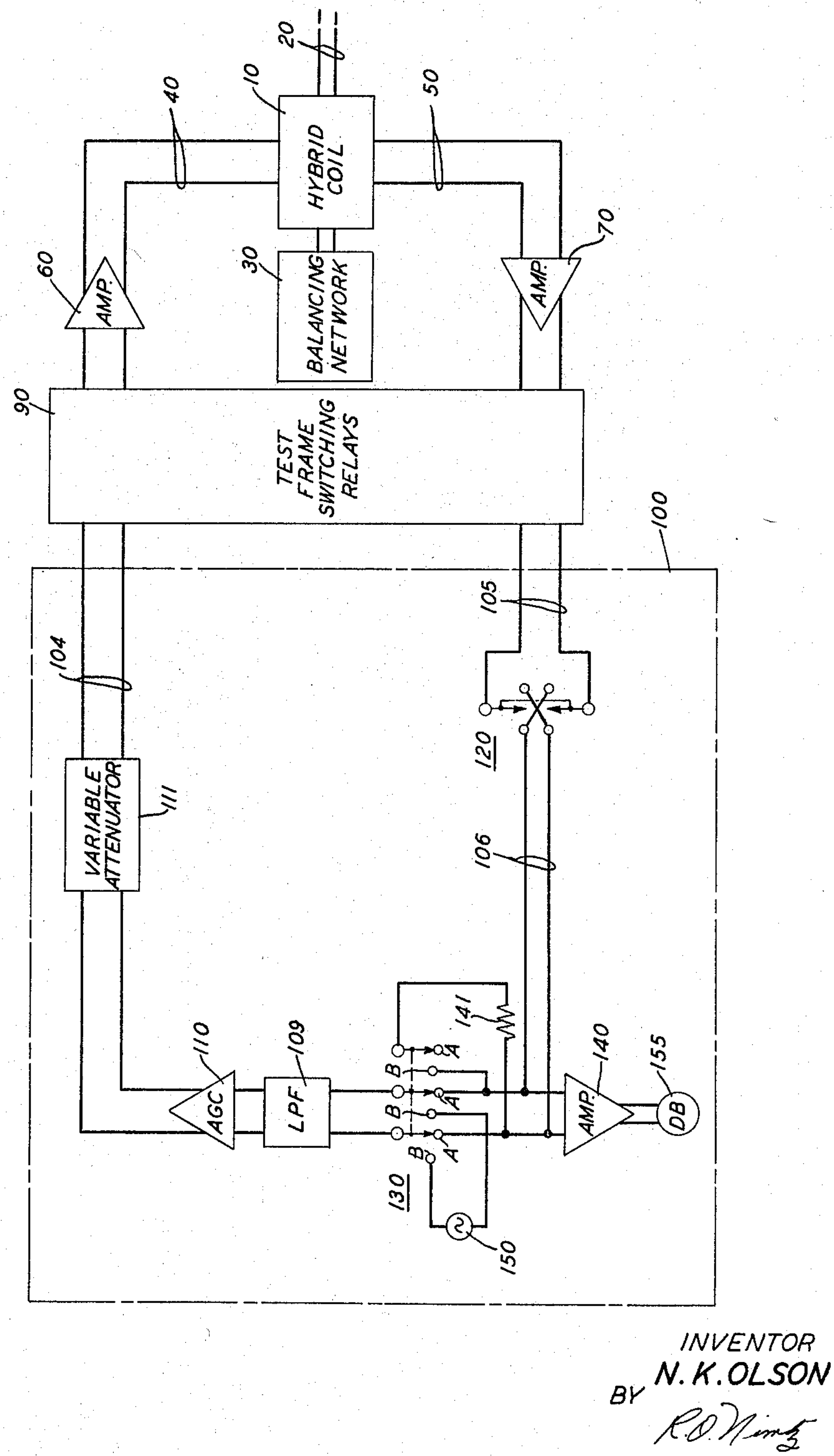
INVENTOR
N. K. OLSON
BY
ATTORNEY United States Patent Office 3,290,452
Patented Dec. 6, 1966

3,290,452

METHODS AND APPARATUS FOR AUTOMATIC SINGING POINT TESTING

Nels K. Olson, Colts Neck, N.J., assignor to Bell Telephone Laboratories, Incorporated, New York, N.Y., a corporation of New York Filed Oct. 24, 1963, Ser. No. 318,649
17 Claims. (Cl. 179—175.31)

This invention relates to testing methods and apparatus for measuring the electrical balance between two circuits and, more particularly, means and methods for measuring the isolation between conjugate transmission paths in a hybrid coil.

Present day two-way long distance telephone communication, because of transmission line attenuation, requires that signals transmitted thereon be amplified. Because of the difficulty of separating random noise from the signal at the receiving end of the transmission line, the amplifiers to offset the attenuation are spaced along the transmission line at regular intervals.

The amplifiers used along the two-way transmission line must be able to amplify signals in both directions. Since ordinary amplifiers are capable of amplifying in one direction only, a special amplifying circuit known as the telephone repeater is used. A repeater is basically an arrangement of two amplifiers inserted at the same point in a telephone transmission line to amplify signals in each direction. Hybrid coils separate signals in the two directions and apply the output of each amplifier to the transmission line, but at the same time isolate that output from the input of the other amplifier. This isolation is accomplished by means of the hybrid balance. A balancing network in the hybrid coil dissipates the energy that would ordinarily be applied to the input of the other amplifier.

The effectiveness of the isolation between conjugate paths through the hybrid coil is dependent upon the impedance match of the balancing network and the transmission line. Because of practical considerations, such as variation of impedances with changes in frequency, a perfect impedance match is impossible. The impedance unbalance will allow some of the signal amplified by one amplifier to be applied to the input of the other amplifier. This unbalance limits the amount of amplification that may be applied to any signal. If the amplification is above a certain level, a signal will circulate through the two amplifiers and prevent the transmission of intelligence signals through the repeater. The amplification level at which this self-sustained conduction occurs is termed the singing point of the repeater.

Singing point tests are conducted on repeaters in advance of actual use to determine the maximum amplification they are capable of producing in the telephone circuit before a singing condition occurs. Basically, a singing point test is performed by increasing the gain of an amplifier connected between the output and the input of one of the hybrid coils of the repeater, forming thereby a closed loop. The gain of the amplifier is increased until the circuit sustains a circulating current. The gain at which this current is set up in the loop is the singing point of the repeater.

Presently, a singing point test is performed by connecting an amplifier, having a manually calibrated gain, across the transmitting and receiving branches of one of the hybrid coils of the repeater. A variable attenuator is inserted to isolate the amplifier input from the hybrid coil. A low-pass filter is included in the loop to limit the upper frequency of the circulating current. The amplifier gain is calibrated at 1000 cycles per second to equal the loss induced by the attenuator. The calibration signal is removed and the loop is closed.

With the loop closed, the attenuation of the attenuator is reduced until the amplifier sustains a singing or a circulating current. The point of singing is determined by the test operator by means of an audible monitor. Two separate tests for singing are made, electrically 180 degrees out of phase, by reversing the tip and ring connections of one of the transmission branches of the hybrid coil. The singing frequency is substantially affected by the phase shift of the signals through the singing path. The opposite phase tests are therefore used to provide alternate data and the worst singing condition data is used.

The above-described method has several inherent limitations in determining singing points of repeaters. Each test as presently conducted must be performed by a skilled manual test operator. It is necessary for the operator to audibly detect the singing point and then record the singing point data. The present method consumes time and manpower and its accuracy is dependent upon the skill of the operator.

It is an object of the present invention to determine the singing points of telephone repeaters with a saving in manpower and with increased accuracy.

It is another object of the present invention to perform the singing point tests automatically without the need of a test operator.

It is yet another object to perform the singing point tests in a much shorter time than is presently required.

In accordance with the present invention, an automatic gain control amplifier adjusted for maximum gain is connected between the transmitting and receiving branches of the hybrid coil. The amplifier automatically adjusts itself to an amplification level just sufficient to maintain a singing condition. This minimum gain is the singing point of the hybrid coil circuit. The decibel measure of the gain of this amplifier is the measure of the singing point loss of the hybrid coil. As in the previous test, the ring and tip connections of one of the transmission branches are reversed to determine the singing point at the opposite phase.

These and other objects, the nature of the present invention and its various advantages, will appear more fully upon consideration of the attached drawing and of the following detailed description of the drawing:

The sole drawing is a general circuit schematic of a singing point test arrangement according to the present invention.

Referring more particularly to the drawing, a part of a telephone repeater including a hybrid coil 10 to which a singing point test is to be applied, according to the present invention, is shown. Hybrid coil 10 includes two pairs of conjugate transmission paths to which there are connected a telephone transmission line 20 and a balancing network 30, and a transmitting branch and receiving branch, 40 and 50, respectively. The transmitting and receiving branches, 40 and 50, each contain an audio frequency amplifier 60 and 70, respectively.

The other hybrid coil of the repeater is not shown, but rather the transmitting and receiving branches, 40 and 50, of hybrid coil 10 are shown terminating on a test frame 90. The test frame 90 is a switching network which may be selectively connected to the transmitting and receiving branches 40 and 50 of a plurality of hybrid coils such as hybrid coil 10, and is permanently connected to the singing point test set 100. The test frame 90 is used to interconnect automatically the test set 100 with any selected hybrid coil 10 whenever a singing point test is to be made.

The singing point test set 100 comprises a conductor pair 104 that connects to the receiving branch 40, and a conductor pair 105 that connects to the transmitting branch 50. Connected in series with the conductor pair 104 are a low-pass filter 109, an automatic gain control amplifier 110, and a variable attenuator 111. The low-pass filter 109 limits the frequency of signals in this path to the audio frequency band normally transmitted by the telephone line 20. Normally such a filter is designed to cut off signals of greater than 3500 cycles per second.

The automatic gain control amplifier 110, together with attenuator 111, provides an output level that may be adjusted to a preselected fixed value regardless of variations of the input. The attenuator 111 is adjusted to provide a standard signal level to the input of receiving amplifier 60. The attenuator may comprise any four-terminal network which will maintain a constant impedance over the audio frequency range.

Connected in series with the conductor pair 105 is a double-pole, double-throw, polarity reversing switch 120 which, when operated, reverses the tip and ring connections of the conductor pair 105 with the conductor pair 106. Switch 120 is used to invert the phase relationships during the test to determine the worst singing condition.

The conductor pair 106 terminates in a three-pole, double-throw switch 130. When switch 130 is switched to position A, as shown, conductor pair 106 is connected to the conductor pair 104, forming a closed loop including hybrid coil 10, automatic gain control amplifier 110, filter 109 and attenuator 111. The input terminals of an isolating amplifier 140 are connected across conductor pair 106.

The isolating amplifier 140 may comprise any amplifier having a high input impedance. The output terminals of amplifier 140 are connected to a meter 155 with a scale calibrated in decibels. Meter 155 may have a visual scale, or may have a permanent recording device attached to its output, or any other means suitable to display the output of the isolating amplifier 140.

Operating the switch 130 to position B disconnects the conductor pairs 104 and 106, connects signal source 150 to filter 109, and connects terminating impedance 141 across conductor pair 106. Signal source 150 supplies a 1000 cycle standard test signal directly to the input of the low-pass filter 109.

In operation, the test circuit 100 is initially calibrated by disconnecting the two-wire trunk 20 from the hybrid coil 10 and placing the switch 130 at position B. The 1000 cycle signal from signal source 150 is applied to the input of the automatic gain control amplifier 110, via the low-pass filter 109. The gain of the amplifier 110 is increased, by attenuating the signal applied to its input until just before its output starts to fall below the standard level. This setting of the amplifier 110 provides maximum gain. The meter 155, connected to the output of the isolating amplifier 140, is adjusted to some reference level, preferably zero. This reference level represents the transhybrid direct transmission losses.

Operating switch 130 to position A completes a circuit loop through the hybrid coil and disconnects the 1000 cycle signal source 150 from the amplifier 110. The two-wire trunk 20 is reconnected to the hybrid coil 10. Since the gain of the amplifier 110 (previously set at maximum) exceeds the transmission losses in the closed loop (i.e., singing path), any hybrid imbalance in hybrid coil 10 allows a current to circulate about the loop. Since the output level provided by the amplifier 110 is constant, the input level to amplifier 110 will be determined by the loss of the loop. The greater the hybrid imbalance, the greater will be the amount of current traversing the loop. As the current increases, the gain of the automatic gain control amplifier 110 decreases. The gain of amplifier 110 under this condition is the maximum gain permissible through the hybrid coil 10 before a singing condition will begin.

The current circulating in this loop will seek its own natural frequency of oscillation, within the limits allowed by the low-pass filter 109, and as determined by the constants of the system and the phase shift through hybrid coil 10. The low-pass filter 109 prevents a singing frequency outside of the normal operating range of the repeater. The singing point, of course, will not occur precisely at the 1000 cycles at which the test set was calibrated, but the bounds defined by the low-pass filter 109 will constrain this frequency to be close enough to 1000 cycles to be sufficiently accurate for routine maintenance.

The switch 120 is used to reverse the phase of the loop current by 180 degrees so as to measure the singing point at two different frequencies. The lowest value read on meter 155 as switch 120 is operated is the figure used for the singing point.

The singing point, recorded by the meter 155, is represented by the change in the output of amplifier 140 from the reference level, set during calibration, to the output level during singing. The test is now concluded, and the test set 100 may be connected through the test frame 90 to a different hybrid coil to be tested where the same process of operation will be repeated.

It is to be understood that the principles of the above invention are not restricted to use with telephone repeaters but may be used wherever it is desired to measure the isolation between conjugate transmission paths in electrical transmission systems.

What is claimed is:

1. In combination, a hybrid coil, a balancing network connected to said hybrid coil, a transmission line and conjugate transmitting means and receiving means all connected to said hybrid coil, variable gain amplification means, means for connecting said amplification means in a closed loop including said transmitting means and said receiving means, said amplification means including means to maintain a constant output level independent of input level variation, and means to measure the gain of said amplification means.

2. The combination according to claim 1 which further includes means to invert the phase of signals in said closed loop.

3. The combination according to claim 1 which further includes means to limit the frequency of signals in said closed loop to a preselected range.

4. In a signal transmission circuit comprising at least a hybrid coil circuit connecting a transmitting branch and a receiving branch in conjugate, means to measure the isolation between said conjugate branches of said hybrid coil, said measuring means including an automatic gain control amplifier adjusted to a fixed output level, the input of said amplifier being adjusted to secure maximum gain, the output and input of said amplifier being connected to said transmitting branch and said receiving branch, respectively, and forming a closed loop thereby, and means to measure the gain of said amplifier necessary to sustain a resonant circulating current in said loop.

5. The combination in claim 4 which further includes means in said receiving branch for changing the phase of said circulating current.

6. The combination in claim 4 which further includes means in said loop to limit the frequency of said resonant circulating current to a preselected range.

7. In combination, a hybrid coil including transmitting and receiving branches, an automatic gain control amplifier having input and output terminals, said automatic gain control amplifier being connected in circuit with said transmitting and receiving branches to form therewith a closed loop, frequency limiting means connected in said loop, calibrating means to adjust the output of said automatic gain amplifier to overcome transmission losses in said loop, means to record the level of the circulating current in the loop, and means to reverse the phase of said circulating current.

8. Apparatus to measure the isolation between the transmitting and receiving branches of a hybrid coil comprising, an automatic gain control amplifier having input means connected in circuit with said transmitting branch and output means connected in circuit with said receiving branch, and means to measure the input level at said input means at which a self-sustaining circulating current is maintained.

9. The apparatus in claim 8 further including means to adjust the phase of said self-sustaining current.

10. The apparatus in claim 8 further including means to limit the frequency of said self-sustaining current.

11. The method of determining the balance between a telephone line and the balancing network of a hybrid coil comprising the steps of applying an amplified signal from the receiving branch of said hybrid coil to the transmitting branch of said hybrid coil forming therefrom a closed loop, adjusting the level of said amplified signal to a fixed level to overcome transmission losses in the closed loop, automatically adjusting the amplification of said signal from said receiving branch to maintain said fixed level, and measuring the amplification of said signal necessary to sustain a circulating current in said loop.

12. The method in claim 11 further including the step of measuring said amplification for a circulating current including a first phase condition, altering the phase of said circulating current, and measuring the amplification gain for a circulating current in said altered phase.

13. In combination, hybrid junction means having at least two pairs of accessible terminals, said terminals comprising at least one conjugate pair, variable gain amplification means including means to automatically maintain a substantially constant output, means to connect said amplification means and said conjugate pair in circuit to form a closed transmission system, and means to determine the gain of the system at which self-sustained oscillation will occur.

14. In combination, hybrid means having four pairs of accessible terminals, each of said terminals being conjugate to one of the remaining three of said terminals, amplification means including means to automatically adjust the gain of said amplifier as a function of its input, said amplification means being connected in circuit with the two of said conjugate terminals to form a closed transmission system, and means to measure the signal level of sustained oscillation in said transmission system.

15. The method of determining the balance between line equipment and balancing equipment in a hybrid coil by forming a closed loop with the conjugately connected transmitting and receiving branches of said hybrid coil, inserting variable amplification means having automatic gain control in said loop, applying a constant amplitude signal to said closed loop, automatically adjusting the gain of said amplification means to the minimum level sufficient to maintain a circulating current in said closed loop through said conjugate connection, removing the signal from said closed loop, and measuring the automatically adjusted gain of said amplification means.

16. The method of claim 15 wherein said circulating current around said closed loop is shifted in phase by a preselected amount.

17. In combination, a hybrid coil interconnecting a telephone transmission line with a transmitting branch and a receiving branch, a closed transmission loop comprising said transmitting branch and said receiving branch, said closed transmission loop including an automatic gain control amplifier and signal frequency limiting means having a signal pass band in the audio range, and means to measure the gain at which said automatic gain control amplifier sustains a circulating current through said closed transmission loop.

References Cited by the Examiner

UNITED STATES PATENTS 2,472,211 6/1949 Herrick ---------- 179—170.8 X

KATHLEEN H. CLAFFY, *Primary Examiner.*

S. J. BOR, R. MURRAY, *Assistant Examiners.*